(12) United States Patent
Engel

(10) Patent No.: US 7,249,525 B1
(45) Date of Patent: Jul. 31, 2007

(54) APPARATUS FOR MEASURING PARAMETERS OF A FLUID IN A LINED PIPE

(75) Inventor: Thomas W. Engel, East Hampton, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 11/473,192

(22) Filed: Jun. 22, 2006

Related U.S. Application Data

(60) Provisional application No. 60/692,852, filed on Jun. 22, 2005.

(51) Int. Cl.
*G01F 1/34* (2006.01)

(52) U.S. Cl. .................................. 73/861.44

(58) Field of Classification Search ............. 73/861.44, 73/861.42, 861.46; 166/236, 205
See application file for complete search history.

(56) References Cited

U.S. PATENT DOCUMENTS

| | | | |
|---|---|---|---|
| 4,048,853 A | 9/1977 | Smith et al. | |
| 4,080,837 A | 3/1978 | Alexander et al. | |
| 4,090,404 A | 5/1978 | Ligier et al. | |
| 4,216,403 A | 8/1980 | Krempl et al. | |
| 4,248,085 A | 2/1981 | Coulthard | |
| 4,445,389 A | 5/1984 | Potzick et al. | |
| 4,638,207 A | 1/1987 | Radice et al. | |
| 4,794,295 A | 12/1988 | Penneck et al. | |
| 4,883,271 A | 11/1989 | French | |
| 4,896,540 A | 1/1990 | Shakkottai et al. | |
| 5,040,415 A | 8/1991 | Barkhoudarian | |
| 5,083,452 A | 1/1992 | Hope | |
| 5,131,278 A | 7/1992 | Baumoel | |
| 5,218,197 A | 6/1993 | Carroll | |

(Continued)

FOREIGN PATENT DOCUMENTS

FR 2725787 4/1996

(Continued)

OTHER PUBLICATIONS

"Noise and Vibration Control Engineering Principles and Applications" Leo L. Beranek and Istvan L. Ver, A. Wiley Interscience Publication, pp. 537-541, Aug. 1992.

(Continued)

*Primary Examiner*—Jewel Thompson
(74) *Attorney, Agent, or Firm*—Robert D. Crawford

(57) ABSTRACT

An apparatus for measuring a parameter of a fluid passing through a pipe comprises a spatial array of pressure sensors disposed at different axial locations along the pipe between a sleeve within the pipe and an inside surface of the pipe. Each of the pressure sensors provides a pressure signal indicative of unsteady pressure within the pipe at a corresponding axial location of the pipe. A signal processor is configured to receive the pressure signals from each of the pressure sensors, and determine the parameter of the fluid using the pressure signals from the pressure sensors. The sleeve and the sensors may be disposed within a pipe spool piece having flanges disposed on opposing ends. The pipe may be formed from a material relatively more rigid than the sleeve, and the sensors may be compressed between the pipe and the sleeve. The sleeve may have grooves formed therein for receiving the sensors, and each sensor may be formed from a piezocable wrapped around the sleeve.

16 Claims, 12 Drawing Sheets

U.S. PATENT DOCUMENTS

| | | | |
|---|---|---|---|
| 5,285,675 | A | 2/1994 | Colgate et al. |
| 5,367,911 | A | 11/1994 | Jewell et al. |
| 5,386,724 | A * | 2/1995 | Das et al. ................ 73/152.59 |
| 5,398,542 | A | 3/1995 | Vasbinder |
| 5,524,475 | A | 6/1996 | Kolpak et al. |
| 5,526,844 | A | 6/1996 | Kamen et al. |
| 5,550,791 | A | 8/1996 | Peloquin |
| 5,591,922 | A | 1/1997 | Segeral et al. |
| 5,741,980 | A | 4/1998 | Hill et al. |
| 5,770,805 | A | 6/1998 | Castel |
| 5,770,806 | A | 6/1998 | Hiismaki |
| 5,835,884 | A | 11/1998 | Brown |
| 5,845,033 | A | 12/1998 | Berthold et al. |
| 5,948,959 | A | 9/1999 | Peloquin |
| 6,016,702 | A | 1/2000 | Maron |
| 6,151,958 | A | 11/2000 | Letton et al. |
| 6,202,494 | B1 | 3/2002 | Ricbel et al. |
| 6,354,147 | B1 | 3/2002 | Gysling et al. |
| 6,378,357 | B1 | 4/2002 | Han et al. |
| 6,435,030 | B1 | 8/2002 | Gysling et al. |
| 6,536,291 | B1 | 3/2003 | Gysling |
| 6,558,036 | B2 | 5/2003 | Gysling et al. |
| 6,601,458 | B1 | 8/2003 | Gysling et al. |
| 6,609,069 | B2 | 8/2003 | Gysling |
| 6,691,584 | B2 | 2/2004 | Gysling et al. |
| 6,698,297 | B2 | 3/2004 | Gysling |
| 6,782,150 | B2 | 8/2004 | Davis et al. |
| 6,813,962 | B2 | 11/2004 | Gysling et al. |
| 6,732,575 | B2 | 12/2004 | Gysling et al. |
| 6,837,098 | B2 | 1/2005 | Gysling et al. |
| 6,862,920 | B2 | 3/2005 | Gysling et al. |
| 6,898,541 | B2 | 5/2005 | Gysling et al. |
| 6,898,562 | B2 | 5/2005 | Gysling et al. |
| 6,945,095 | B2 | 9/2005 | Johansen |
| 6,550,342 | B2 | 4/2006 | Croteau et al. |
| 7,055,598 | B2 * | 6/2006 | Ross et al. ................... 166/236 |
| 6,587,798 | B2 | 7/2006 | Kersey et al. |
| 6,868,737 | B2 | 3/2007 | Croteau et al. |

FOREIGN PATENT DOCUMENTS

| | | |
|---|---|---|
| GB | 2282931 | 4/1995 |
| WO | 0062759 | 7/2006 |

OTHER PUBLICATIONS

"Two Decades of Array Signal Processing Research, The Parametric Approach", H. Krim and M. Viberg, IEEE Signal Processing Mazazine, Jul. 1996, pp. 67-94.

Development of an Array of Pressure Sensors with PVDF film, Experiments in Fluids 26, Jan. 8, 1999, Springer-Verlag, pp. 27-35.

"Vicous Attentuation of Acoustic Waves in Suspension" by R. L. Givson, Jr. and M. N. Toksoz, Acoustic Society of America, May 1898 pp. 1925-1933.

"New Flowmeter Principle" by Walt Boyes - Published in Flow Control Magazine - Oct. 2003 Issue.

"Piezoelectric Polymers" By J. S. Harrison and Z. Qunaies - ICASE Report pp. 1-26.

"Mass Fraction Measurements in Multiphase Flow Using a Clamp on PVDF Array" Johan Carlson, Oct. 2000.

"PVDF and Array Tranducers" Robert A. Day, NDTnet-Sep. 1996, vol. 1. No. 9.

"Polymer Piezoeletric Transducers for Ultrasonic NDE", Yhoseph Bar-Chohen, Tianji Xu and Shyh-Shiuh Lih, NDTnet - Sep. 1996, vol. 1, No. 9.

"Piezoelectric Sensors Technical Manual"- Measurements Specialities, Inc. P/N 1005663-1 - Rev. B Apr. 2, 1999.

* cited by examiner

APPARATUS FOR MEASURING PARAMETERS OF A FLUID IN A LINED PIPE

CROSS-REFERENCE TO RELATED PATENT APPLICATIONS

This application claims the benefit of U.S. Provisional Application No. 60/692,852 filed Jun. 22, 2005, which is incorporated herein by reference in its entirety.

BACKGROUND

1. Technical Field

The present invention generally relates to an apparatus for measuring parameters of a fluid within a pipe; and more particularly to an apparatus for measuring parameters of a fluid within a lined pipe.

2. Background

A fluid flow process (flow process) includes any process that involves the flow of fluid through pipe, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in an industrial flow process. Such physical parameters include, for example, volumetric flow rate, composition, consistency, density, and mass flow rate. While existing sensing technologies work well for their suited application, there always remains a desire to increase sensing accuracy.

SUMMARY

The above-described and other needs are met by an apparatus for measuring a parameter of a fluid passing through a pipe having a sleeve disposed therein through which the fluid passes. The apparatus comprises a spatial array of pressure sensors disposed between the sleeve and an inside surface of the pipe at different axial locations along the pipe. Each of the pressure sensors provides a pressure signal indicative of unsteady pressure within the pipe at a corresponding axial location of the pipe. A signal processor is configured to receive the pressure signals from each of the pressure sensors, and determine the parameter of the fluid using the pressure signals from the pressure sensors.

In one embodiment, the sleeve and the sensors are disposed within a pipe spool piece having flanges disposed on opposing ends. The end portions of the sleeve may conform to at least a portion of the flanges, and the pipe spool piece may be formed from cylindrical sections. The pipe spool piece may include a housing attached thereto for containing electrical components associated with the pressure sensors.

The pipe may be formed from a material relatively more rigid than the sleeve, and the sensors may be compressed between the pipe and the sleeve. For example, the sleeve may be formed from a polymer, such as Teflon. The sleeve may have grooves formed therein for receiving the sensors, and each sensor may be formed from a piezocable wrapped around the sleeve.

The foregoing and other objects, features and advantages of the present invention will become more apparent in light of the following detailed description of exemplary embodiments thereof.

BRIEF DESCRIPTION OF THE DRAWING

Referring now to the drawing wherein like items are numbered alike in the various Figures.

DETAILED DESCRIPTION

As described in U.S. patent application Ser. Nos. 10/007, 749, 10/349,716, 10/376,427, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process.

Figure 1:
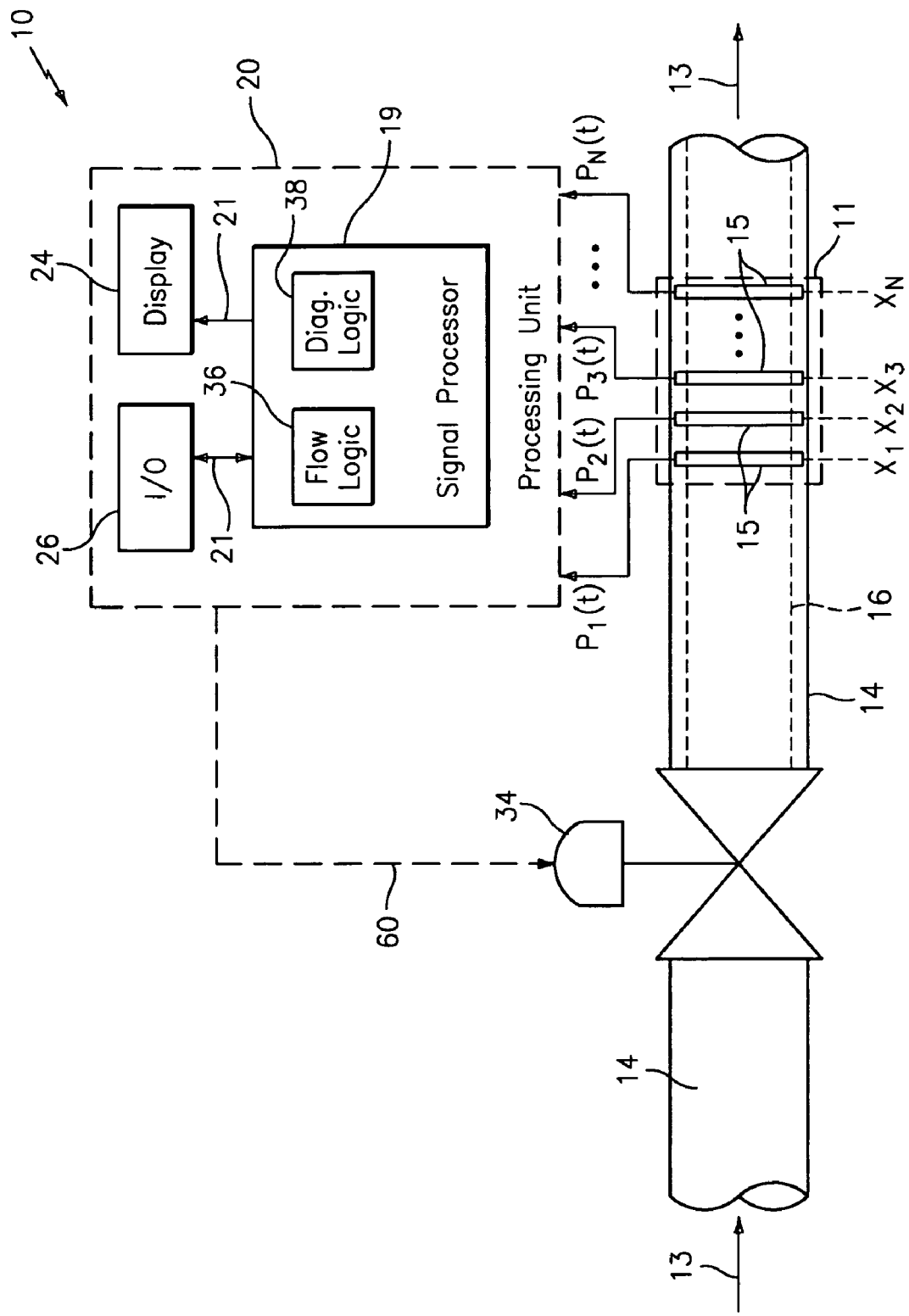
FIG. 1 is schematic diagram of an apparatus for determining at least one parameter associated with a fluid flowing in a pipe, the apparatus including a configurable array of sensors for characterizing unsteady pressures in the fluid, in accordance with various embodiments of the present invention.

Referring to FIG. 1, an apparatus 10 for measuring at least one parameter associated with a fluid 13 flowing within a pipe 14 is shown. The parameter of the fluid may include, for example, at least one of: density of the fluid 13, volumetric flow rate of the fluid 13, mass flow rate of the fluid 13, composition of the fluid 13, entrained air in the fluid 13, consistency of the fluid 13, size of particles in the fluid 13, and health of a device 34 causing the unsteady pressures to be generated in the pipe 14. The pipe 14 has a sleeve (lining) 16 disposed therein through which the fluid 13 passes. The sleeve 16 may be formed from rubber, plastic, metal, polymers, or any suitable material being relatively less rigid than the material forming the pipe. For example, the sleeve 16 may be Teflon or other such material typically used in lining a pipe.

The apparatus 10 includes a spatial array 11 of at least two pressure sensors 15 disposed between the sleeve and an inside surface of the pipe at different axial locations $x_1 \ldots x_N$ along the pipe 14. Each of the pressure sensors 15 provides a pressure signal P(t) indicative of unsteady pressure within the pipe 14 at a corresponding axial location $x_1 \ldots x_N$ of the pipe 14. A signal processor 19 receives the pressure signals $P_1(t) \ldots P_N(t)$ from the pressure sensors 15 in the array 11, determines the parameter of the fluid 13 using pressure signals from the pressure sensors 15, and outputs the parameter as a signal 21. It has been determined that placing the sensors 15 between the sleeve and the pipe results in increased sensitivity of the sensors to the acoustic waves propagating through the fluid within the pipe and/or pressure disturbances that convect with the fluid flowing in the pipe while compared to placing the sensors 15 on the outer surface of the pipe 14. It is believed that this increased sensitivity is due, at least in part, because, with the sensors disposed between the sleeve and the pipe, the sensors are further decoupled from vibration of the pipe.

While the apparatus is shown as including four pressure sensors 15, it is contemplated that the array 11 of pressure sensors 15 includes two or more pressure sensors 15, each providing a pressure signal P(t) indicative of unsteady pressure within the pipe 14 at a corresponding axial location X of the pipe 14. For example, the apparatus may include 2, 3, 4, 5, 6, 7, 8, 9, 10, 11, 12, 13, 14, 15, 16, 17, 18, 19, 20, 21, 22, 23, or 24 pressure sensors 15. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desired update rate of the output parameter provided by the apparatus 10. The fluid 13 may be a single or multiphase fluid flowing through a duct, conduit or other form of pipe 14.

The signals $P_1(t) \ldots P_N(t)$ provided by the pressure sensors 15 in the array 11 are processed by the signal processor 19, which may be part of a larger processing unit 20. For example, the signal processor 19 may be a microprocessor and the processing unit 20 may be a personal computer or other general purpose computer. It is contemplated that the signal processor 19 may be any one or more signal processing devices for executing programmed instructions, such as one or more microprocessors or application specific integrated circuits (ASICS), and may include memory for storing programmed instructions, set points, parameters, and for buffering or otherwise storing data.

Figure 2:
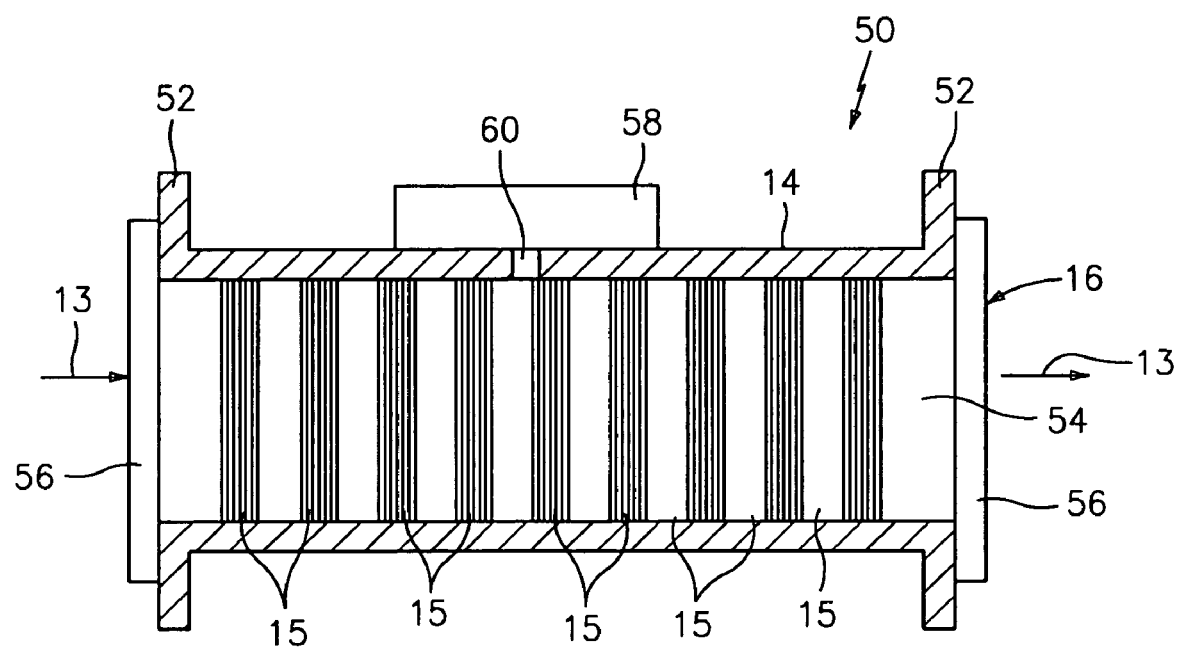
FIG. 2 is a partial cross-section diagram of a spool piece including sensors disposed around a sleeve within a pipe, in accordance with various embodiments of the present invention.

Referring to FIG. 2, the sleeve 16 and the sensors 15 may be disposed within a removable section of pipe (pipe spool piece) 50 having flanges 52 disposed on opposing ends. The flanges 52 allow the insertion of the spool piece 50 within a piping system. For example, the flanges 52 may be bolted or welded to mating flanges in the piping system. In the embodiment shown, the sleeve 16 includes a hollow cylindrical structure 54 around which the sensors 15 are disposed. End portions 56 of the sleeve 16 extend radially outward from the cylindrical portion 54 and conform to at least a portion of the flanges 52. This arrangement allows the end portions 56 of the sleeve 16 to be compressed as gaskets when the spool piece 50 is secured within the piping system. In this manner, the end portions 56 help to seal the fluid 13 within the pipe 14 and prevent the fluid 13 from contacting the sensors 15.

To facilitate assembly of the sleeve 16, sensors 15, and spool piece 50, the spool piece 50 may be formed from cylindrical sections (e.g., two half-cylinders or four quarter cylinders), which are coupled together. This arrangement allows the spool piece 50 to be assembled around the sleeve 16 after the sensors 15 have been mounted to the sleeve 16.

The spool piece 50 may include a housing 58 attached thereto for containing electrical components associated with the pressure sensors. For example, the housing 58 may contain a preamplifier that receives the signals output from the sensors 15. The pipe 14 may include a hole 60 disposed therein to allow electrical wires to connect between the electronics in the housing and the sensors 15.

Figure 3:
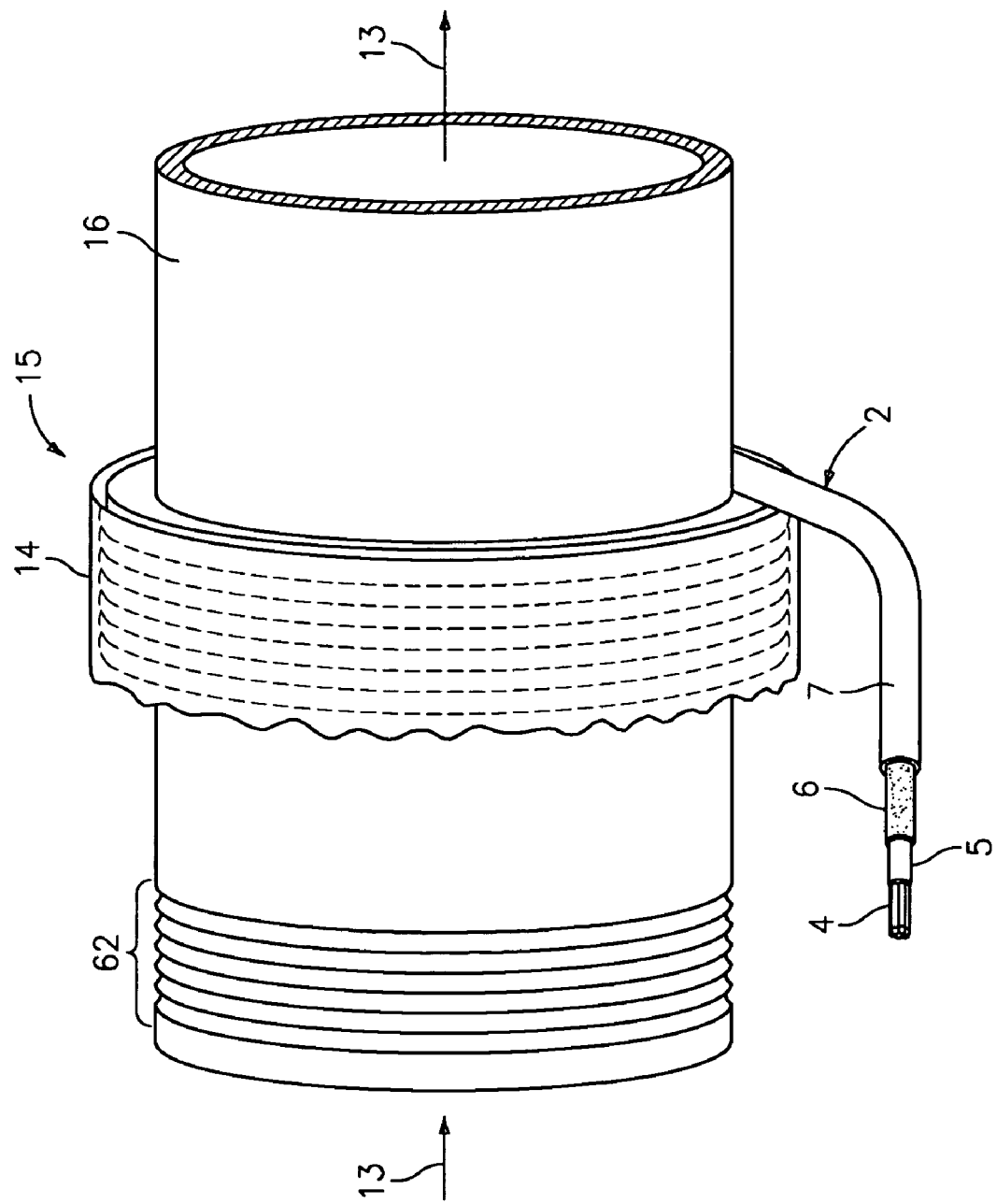
FIG. 3 depicts a sensor in the form of a piezocable disposed around a portion of the sleeve disposed within the pipe.

FIG. 3 depicts one sensor 15 in the form of a piezocable disposed around a portion of the sleeve 16 disposed within the pipe 14. In this embodiment, the sensor 15 comprises a cable 2 wrapped around the sleeve 16 and compressed against the inside surface of the pipe 14. The cable 2 may have grooves 62 formed therein for receiving the sensor 15. The grooves 62 facilitate the manufacture of the sensors 15 by ensuring proper spacing of the sensors 15. In addition, the grooves 62 help keep the cable 2 in-place during operation.

The cable 2 includes: an inner (first) electrical conductor 4, a piezoelectric material 5 disposed around the inner electrical conductor 4, an outer (second) electrical conductor 6 disposed around the piezoelectric material 5, and a dielectric jacket 7 disposed around the piezoelectric material 5 and the outer and inner electrical conductors 4, 6.

The cable 2 provides the signal indicative of unsteady pressure within the pipe 14 in response to expansion and contraction of the sleeve 16. More specifically, expansion and contraction of the sleeve 16, as may be caused by one or both of acoustic waves propagating through the fluid 13 within the pipe and/or pressure disturbances that convect with the fluid 13 flowing in the pipe 14 (e.g., turbulent eddies and vortical disturbances), cause the cable 2 to be strained longitudinally and/or strained radially against the pipe 14. In response to this longitudinal and/or radial strain, the piezoelectric material 5 generates a varying electrical charge between the inner and outer conductors 4, 6. The electrical charge varies in proportion to the amount of longitudinal and/or radial strain, and thus provides indication of the amount of expansion and contraction of the sleeve 16 and, therefore, provides indication of the acoustic waves propagating through the fluid 13 within the pipe 14 and/or pressure disturbances that convect with the fluid 13 flowing in the pipe 14. The varying electrical charge, which may be amplified, impedance converted, and otherwise conditioned (e.g., filtered), is provided as the output signal from the sensor 15.

In the embodiment of FIG. 3, the cable 2 is wrapped helically around the sleeve 16 six times to form six coils or turns. It is contemplated that the number of turns may be equal to one, two, three, four, five, six, seven, eight, sixteen, twenty four, or N number of turns. Generally, the sensitivity of the sensor 15 to unsteady pressures within the pipe 14 increases as the number of turns increases. Also as the number of turns increases, the width of the sensor 15 relative to the longitudinal axis of the pipe 14 increases, thereby decreasing the axial resolution of the sensor 15 (i.e., it senses a wider area along the length of the pipe 14). Therefore, the number of turns used is dependent at least on the degree of sensitivity desired and the axial resolution desired.

In the embodiment of FIG. 3, the inner conductor 4 forms a core of the cable 2 and is comprised of strands of electrically conductive material (e.g., copper, aluminum, and the like). It is also contemplated that the inner conductor 4 may be solid, or may be strands or an extrusion disposed around another rigid material that forms the core of the cable 2. The piezoelectric material 5 is helically wrapped around the inner conductor 4, although the scope of the invention is intended to include embodiments in which the piezoelectric material 5 is otherwise braided, extruded, or molded around the inner conductor 4. The piezoelectric material 5 may include any piezo-active material (e.g., polyvinylidene fluoride (PVDF)), and may include copolymers of PVDF and other materials such as trifluoroethylene (TrFE) or tetrafluorethylene (TFE). For example, a description of piezoelectric materials is provided in J. S. Harrison and Z. Ounaies, Piezoelectric Polymers, NASA/CR-2001-211422 ICASE Report No. 2001-43, ICASE Mail Stop 132C NASA Langley Research Center Hampton, Va. 23681-2199, December 2001, pp. 31.

The outer conductor 6 is shown as braided strands of electrically conductive material (e.g., copper, aluminum, and the like). It is also contemplated that the outer conductor 6 may be wrapped, extruded, or deposited around the piezoelectric material 5. The jacket 7 may be formed from any electrically insulative (dielectric) material to environmentally seal the cable 2 and protect it against thermal stimulus. For example, the jacket 7 may be formed from polyethylene or the like. One example of a cable 2 that may be used with the present invention is commercially available from Measurement Specialties, Inc. of Fairfield, N.J. as part number 1005801-1 or 1005646-1.

Figure 5:
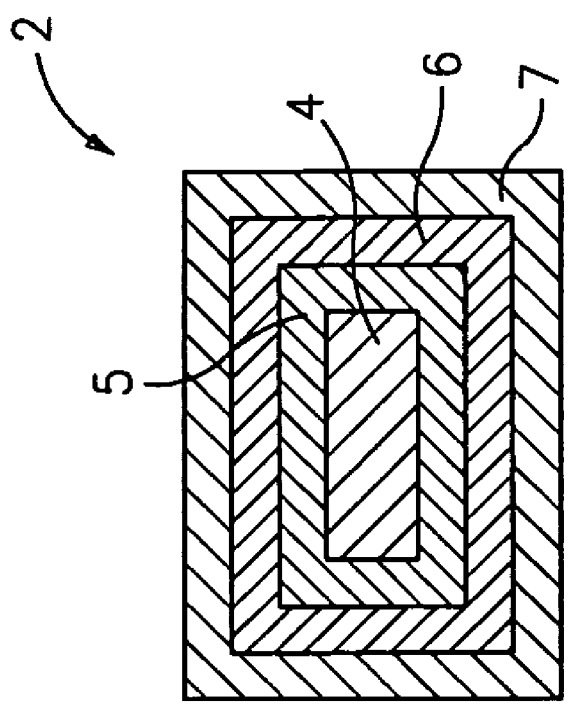
FIG. 5 is a cross-sectional view of an alternative piezocable for use with the sensor of the present invention.
Figure 4:
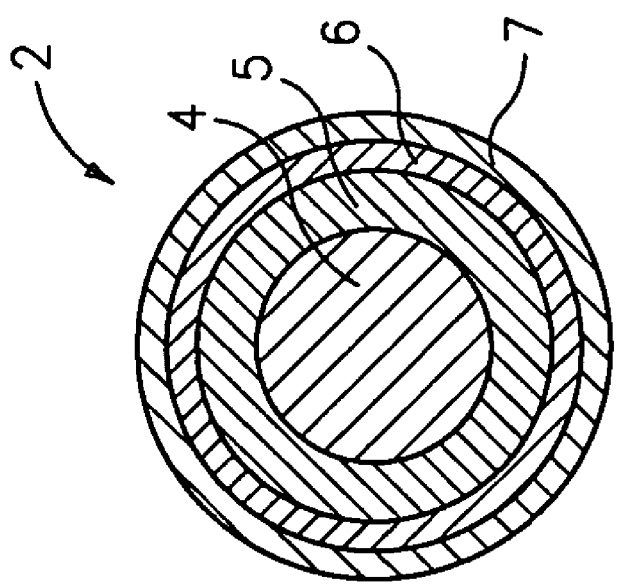
FIG. 4 is a cross-sectional view of a piezocable for use with the sensor of the present invention.

Referring to FIG. 4, the cable 2 may have a circular cross section. Alternatively, the cable 2 may have a quadrilateral (e.g., square, rectangular, etc.) cross section, as shown in FIG. 5. It is contemplated that a cable 2 of any convenient cross sectional shape may be used.

While FIGS. 3-5 depict the pressure sensors 15 as being formed from piezocables, it is contemplated that the pressure sensors 15 may include electrical strain gages, optical fibers and/or gratings, ported sensors, ultrasonic sensors, among others as described herein, and may be attached to the inner surface of the pipe 14 and/or the sleeve 16 by adhesive, glue, epoxy, tape or other suitable attachment means to ensure suitable contact. The sensors 15 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in the sleeve 16.

It is also within the scope of the present invention that any other strain sensing technique may be used to measure the variations in strain in the sleeve 16, such as highly sensitive piezoelectric, electronic or electric, strain gages attached to or embedded in the sleeve 16.

The pressure sensors 15 may incorporate a built-in MOSFET microelectronic amplifier to convert the high-impedance charge output into a low-impedance voltage signal. The sensors 15 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore the present invention contemplates that each of the pressure sensors 15 may include a piezoelectric sensor that provides a piezoelectric material to measure the unsteady pressures of the fluid 13. The piezoelectric material, such as the polymer, polarized fluoropolymer, PVDF, measures the strain induced within the process pipe 14 due to unsteady pressure variations within the fluid 13. Strain within the sleeve 16 is transduced to an output voltage or current by the attached piezoelectric sensors 15.

The PVDF material forming each piezoelectric sensor 15 may be adhered to the outer and/or inner surface of a steel strap that extends around and clamps onto the outer surface of the sleeve 16, similar to that described in U.S. patent application Ser. No. 10/712,818, filed Nov. 12, 2003, which is incorporated herein by reference. The piezoelectric sensing element is typically conformal to allow complete or nearly complete circumferential measurement of induced strain. The sensors can be formed from PVDF films, copolymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140 C) (co-polymers)

The piezoelectric film sensor includes piezoelectric film disposed between and pair of conductive coatings, such as silver ink. The piezoelectric film and conductive coatings are coated onto a protective sheet (e.g., mylar) with a protective coating disposed on the opposing side of the upper conductive coating. A pair of conductors is attached to a respective conductive coating.

The thickness of the piezoelectric film may be in the range of 8 um to approximately 110 um. The thickness is dependent on the degree of sensitivity desired or needed to measure the unsteady pressures within the sleeve 14. The sensitivity of the sensor increases as the thickness of the piezoelectric film increases.

The piezoelectric film sensor 30 is adhered or attached to a strap 72 which is then clamped (or strapped) onto the inner and/or outer surface of the sleeve 16 at each respective axial location, similar to that described in U.S. Provisional Application No. 60/425,436, filed Nov. 12, 2002; and U.S. Provisional Application No. 60/426,724, which are incorporated herein by reference. The piezoelectric film sensor is attached to the surface of the strap in relation to the pipe 14. The piezoelectric film sensor may extend over the substantial length of the strap or some portion less than the strap to provide a circumferentially averaged pressure signal to the processing unit 20.

The ends of the strap may be permanently secure together or removable secured (e.g., bolts, screw, clips, etc.) to enable removal or relocation of the straps.

While the piezoelectric film sensor was mounted to the outer surface of the straps, the present invention contemplates the piezoelectric film sensor may be mounted to the inner surface of the strap, thereby resulting in the piezoelectric sensor being disposed between the strap and the outer surface of the sleeve.

The present invention also contemplates that the piezoelectric film sensors may be mounted directly onto the inner surface of the pipe 14 and/or outer surface of the sleeve 16 by epoxy, glue or other adhesive, similar to that shown in U.S. patent application Ser. No. 10/712,833, filed on Nov. 12, 2003, which is incorporated herein by reference.

The sensors may comprise a mulitband sensor assembly similar to that described in U.S. patent application Ser. No. 10/795,111, filed on Mar. 4, 2004, which is incorporated herein by reference. The multiband sensor assembly is wrapped and mounted to the outer surface of the sleeve. The multi-band sensor assembly includes a strip of piezoelectric film attached to a respectective band of a multi-band strap. The multi-band strap is formed of a single sheet of metallic material (e.g., stainless steel) by stamping or punching voids into the sheet material. The multi-band strap includes a plurality of bands that are spaced a predetermined distance apart. The bands may be equi-spaced or disposed at different spacings. In one embodiment, the spacing is approximately 40% of the diameter of the sleeve.

The type of unsteady pressure measurement being made (SOS v. Vortical Disturbances) determines the spacing of the sensors. Measurement of unsteady vortical pressures prefers the array of sensors to be spaced such that the length of the array is less than the coherence length of the vortical disturbances which is typically on the order of a pipe diameter. Measurement of the acoustic pressures prefers the array of sensors to be space such that the length of the array of sensors is as long as a predetermined portion of the wavelength of the measured acoustic signal (e.g., greater than 20% of the wavelength of the acoustic signal). The desired wavelength of the measured acoustic signal is dependent upon the dispersion of particles in the fluid flow, which is dependent on the particle size, such as that described in U.S. patent application Ser. No. 10/349,716, filed Jan. 23, 2003 and U.S. patent application Ser. No. 10/376,427, filed Feb. 26, 2003, which are all incorporated by reference.

The multi-band strap also includes a plurality of cross members spaced along the length of the bands to maintain the spacing between the bands over their lengths. The ends of the bands are also interconnected by opposing end strips. The cross members are formed in the shape of an X, however, the invention contemplates that the cross members may be in the form of straight members extending perpendicular between the bands or diagonal to the bands. These diagonal members may be angled in the same direction or different directions. The cross members advantageously provide that the sensors are properly spaced apart and maintained at the proper distance during the mounting of the sensor assembly to the outer surface 22 of the sleeve 16. The interconnection of the bands also permits all the sensors 15 to be mounted to the sleeve simultaneously and thus reduces the time of mounting the sensor assembly to the sleeve. The unitary multi-band strap ensures the sensors 15 are properly space.

The multi-band sensor assembly is wrapped around the sleeve 16 and the ends are attached to each other by a pair of stiffening rails. The stiffening rails are attached (e.g., welded) to the ends of the multi-band strap of the sensor assembly. The rails extend the length of the end strips of the multi-band strap. As shown, the ends of the multi-band strap are bend to engage the inner surface of the rails. The bent ends of the multi-band strap are then welded to the inner surface of each respective rod. While the multi-band strap is welded to the rails, other fastening means may be used, such as bolts and screws.

When mounting or clamping the sensor assembly to the pipe, the ends of the sensor assembly are secured together by bolts or screws, or other fasteners, which interconnect the stiffening rods. To insure proper alignment of the rails, one rail may include a guide pin and the other rail a hole for receiving the pin.

The multi-band sensor assembly includes a shield, dispose around the outside of the multi-band strap to provide a grounding shield. The grounding shield may comprise metallic sheet material, screen or web.

Referring again to FIG. 1, the signal processor 19 determines the one or more parameters 21 of the flow process by applying the data from the selected pressure sensors 15 to flow logic 36 executed by signal processor 19. The one or more parameters 21 may include such parameters as volumetric flow rate, mass flow rate, density, composition, entrained air, consistency, particle size, velocity, mach number, speed of sound propagating through the fluid 13, and/or other parameters of the fluid 13. The flow logic 36 is described in further detail hereinafter.

The signal processor 19 may also apply one or more of the signals 15 and/or one or more parameters 21 from the flow logic 36 to diagnostic logic 38. Diagnostic logic 38 is executed by signal processor 19 to diagnose the health of any device 34 in the process flow that causes unsteady pressures to be generated in the pipe 14. In FIG. 1, device 34 is depicted as a valve; however, it is contemplated that device 34 may be any machinery, component, or equipment, e.g., motor, fan, pump, generator, engine, gearbox, belt, drive, pulley, hanger, clamp, actuator, valve, meter, or the like. The signal processor 19 may output one or more parameters 21 indicative of the health of the diagnosed device 34. The signal processor may also output a control signal 60 to control the device 34 in response to the parameter 21. The diagnostic logic 38 is described in further detail hereinafter.

The signal processor 19 may output the one or more parameters 21 to a display 24 or another input/output (I/O) device 26. The I/O device 26 also accepts user input parameters 48 as may be necessary for the flow logic 36 and diagnostic logic 38. The I/O device 26, display 24, and signal processor 19 unit may be mounted in a common housing, which may be attached to the array 11 by a flexible cable, wireless connection, or the like. The flexible cable may also be used to provide operating power from the processing unit 20 to the array 11 if necessary.

Diagnostic Logic

Figure 6:
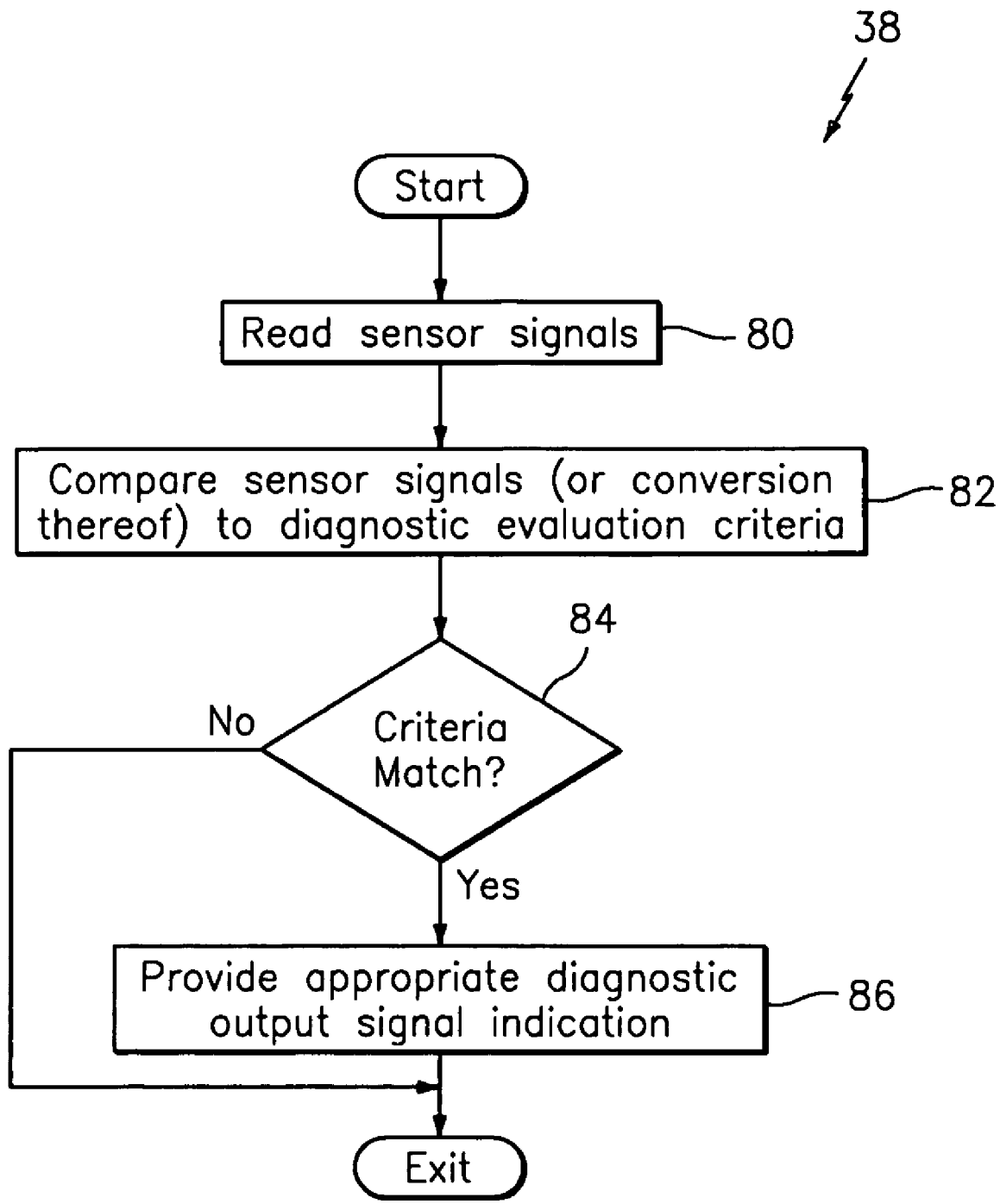
FIG. 6 is a block diagram of a diagnostic logic used in the apparatus of the present invention.

Referring to FIG. 6 the diagnostic logic 38 measures the sensor input signals (or evaluation input signals), which may include one or more of the signals $P_1(t)$, $P_2(t)$, $P_3(t)$, ... $P_N(t)$ and the parameters 21, at a step 80. Next, the diagnostic logic 38 compares the evaluation input signals to a diagnostic evaluation criteria at a step 82, discussed hereinafter. Then, a step 84 checks if there is a match, and if so, a step 86 provides a diagnostic signal indicative of the diagnostic condition that has been detected and may also provide information identifying the diagnosed device. The diagnostic signal may be output as a parameter 21.

Where the evaluation input signal is a parameter 21, as may be output from the flow logic 36, the diagnostic evaluation criteria may be based on a threshold value of the flow signal 24. For example, the threshold value may be indicative of a maximum or minimum sound speed, mach number, consistency, composition, entrained air, density, mass flow rate, volumetric flow rate, or the like. If there is not a criteria match in step 84, the diagnostic logic 38 exits.

Where the evaluation input signal includes one or more signals $P_1(t)$, $P_2(t)$, $P_3(t)$, ... $P_N(t)$, the diagnostic evaluation criteria may be a threshold (maximum or minimum) pressure. Alternatively, the diagnostic evaluation criteria may be based on an acoustic signature, or a convective property (i.e., a property that propagates or convects with the flow). For example, the diagnostic logic 38 may monitor the acoustic signature of any upstream or downstream device (e.g., motor, fan, pump, generator, engine, gear box, belt drive, pulley, hanger, clamp, actuator, valve, meter, or other machinery, equipment or component). Further, the data from the array 11 may be processed in any domain, including the frequency/spatial domain, the temporal/spatial domain, the temporal/wave-number domain, or the wave-number/frequency (k-ω) domain or other domain, or any of the above. As such, any known array processing technique in any of these or other related domains may be used if desired.

For example, for three unsteady pressure signals, the equations in the frequency/spatial domain equation would be: $P(x,\omega) = Ae^{-ik_r x} + Be^{+ik_r x}$; the temporal/spatial domain would be: $P(x,t) = (Ae^{-ik_r x} + Be^{+ik_r x})e^{i\omega t}$; and the k-ω domain (taking the spatial Fourier transform) would be:

$$P(k, \omega) = \frac{1}{2\pi}\int_{-\infty}^{+\infty} P(x, \omega) e^{ikx} dx = A(\omega)\delta\left(k - \frac{\omega}{a}\right) + B(\omega)\delta\left(k + \frac{\omega}{a}\right)$$

where k is the wave number, a is the speed of sound of the material, x is the location along the pipe, ω is frequency (in rad/sec, where ω=2πf), and δ is the Dirac delta function, which shows a spatial/temporal mapping of the acoustic field in the k-ω plane.

Any technique known in the art for using a spatial (or phased) array of sensors to determine the acoustic or convective fields, beam forming, or other signal processing techniques, may be used to provide an input evaluation signal to be compared to the diagnostic evaluation criteria.

Flow Logic

Velocity Processing

Figure 7:
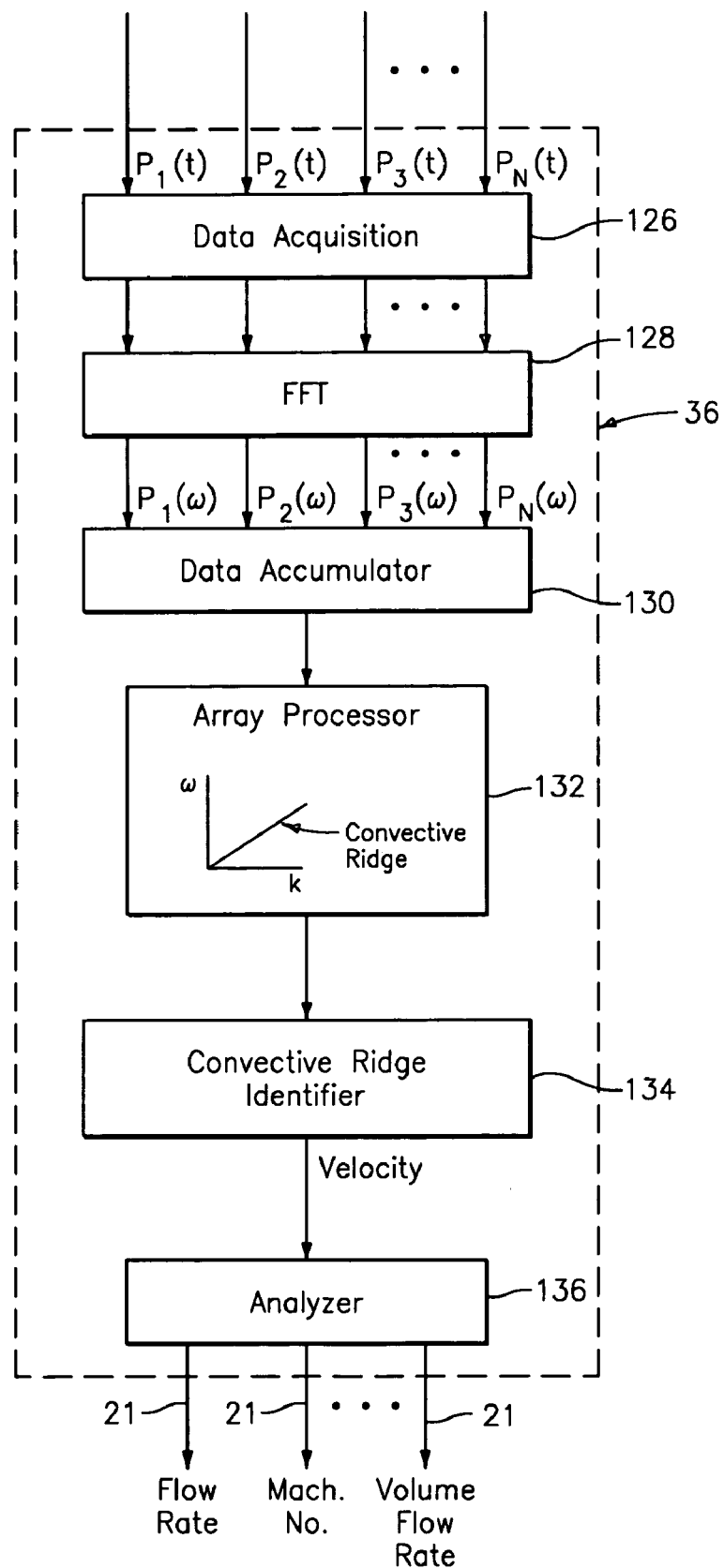
FIG. 7 is a block diagram of a first embodiment of a flow logic used in the apparatus of the present invention.
Figure 8:
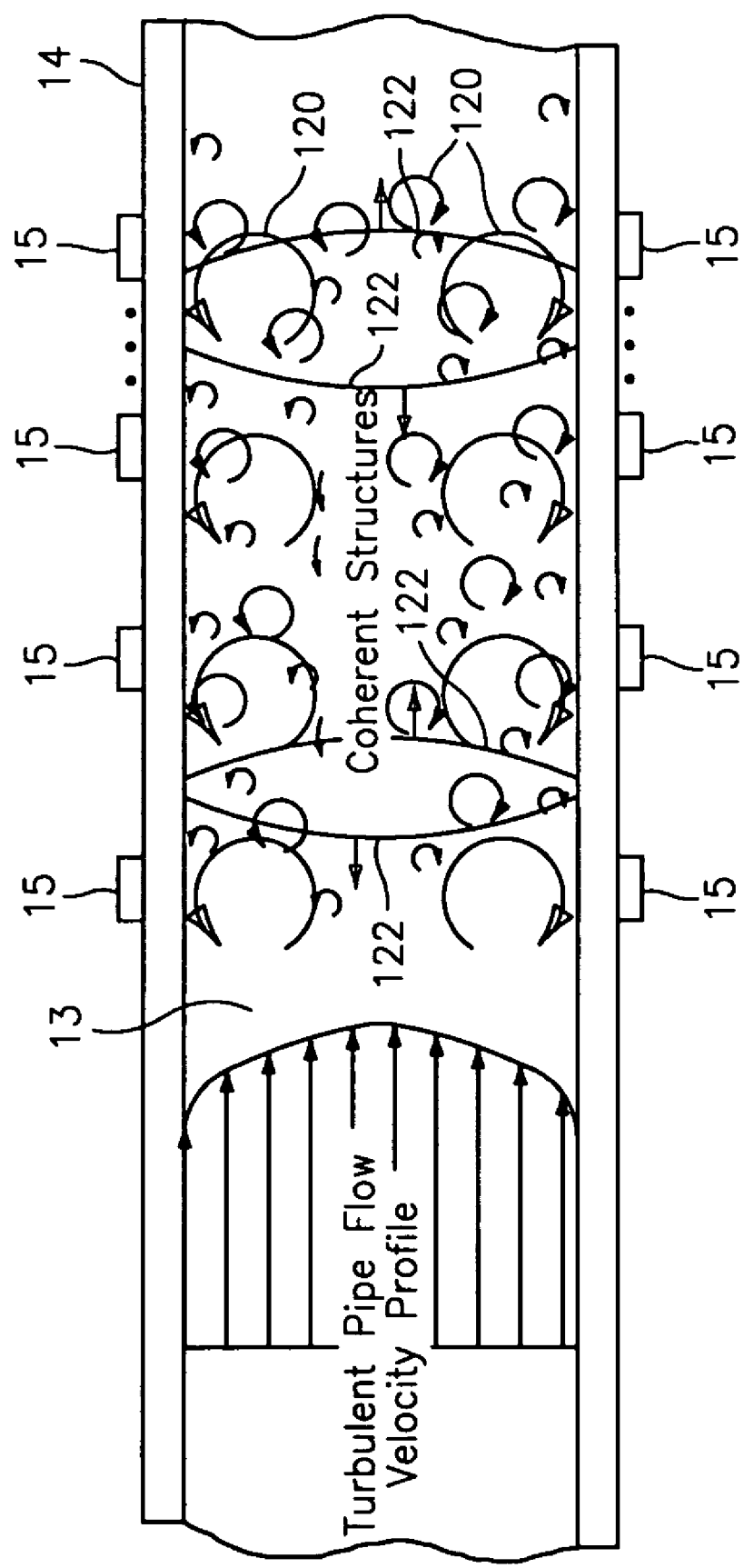
FIG. 8 is a cross-sectional view of a pipe having coherent structures therein.

Referring to FIG. 7, an example of flow logic 36 is shown. As previously described, the array 11 of at least two sensors 15 located at two locations $x_1, x_2$ axially along the pipe 14 sense respective stochastic signals propagating between the sensors 15 within the pipe 14 at their respective locations. Each sensor 15 provides a signal indicating an unsteady pressure at the location of each sensor 15, at each instant in a series of sampling instants. One will appreciate that the array 11 may include more than two sensors 15 distributed at locations $x_1 \ldots x_N$. The pressure generated by the convective pressure disturbances (e.g., eddies 120, see FIG. 8) may be measured through strained-based sensors 15 and/or pressure sensors 15. The sensors 15 provide analog pressure time-varying signals $P_1(t)$, $P_2(t)$, $P_3(t)$ ... $P_N(t)$ to the signal processor 19, which in turn applies selected ones of these signals $P_1(t)$, $P_2(t)$, $P3(t)$, ... $P_N(t)$ to the flow logic 36.

The flow logic 36 processes the selected signals $P_1(t)$, $P_2(t)$, $P_3(t)$, ... $P_N(t)$ to first provide output signals (parameters) 21 indicative of the pressure disturbances that convect with the fluid (process flow) 13, and subsequently, provide output signals (parameters) 21 in response to pressure disturbances generated by convective waves propagating through the fluid 13, such as velocity, Mach number and volumetric flow rate of the process flow 13.

The signal processor 19 includes data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega)$, $P_2(\omega)$, $P_3(\omega)$, ... $P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S. patent application, Ser. No. 10/007,736 and U.S. patent application Ser. No. 09/729,994, filed Dec. 4, 200, now U.S. Pat. No. 6,609,069, which are incorporated herein by reference.

A data accumulator 130 accumulates the frequency signals $P_1(\omega)$-$P_N(\omega)$ over a sampling interval, and provides the data to an array processor 132, which performs a spatial-temporal (two-dimensional) transform of the sensor data, from the xt domain to the k-ω domain, and then calculates the power in the k-ω plane, as represented by a k-ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by k=2π/λ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-$\omega$ pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 is distributed over a range of length scales and hence temporal frequencies.

To calculate the power in the k-$\omega$ plane, as represented by a k-$\omega$ plot (see FIG. 9) of either the signals, the array processor 132 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensors 15.

The present invention may use temporal and spatial filtering to precondition the signals to effectively filter out the common mode characteristics Pcommon mode and other long wavelength (compared to the sensor spacing) characteristics in the pipe 14 by differencing adjacent sensors 15 and retain a substantial portion of the stochastic parameter associated with the flow field and any other short wavelength (compared to the sensor spacing) low frequency stochastic parameters.

Figure 9:
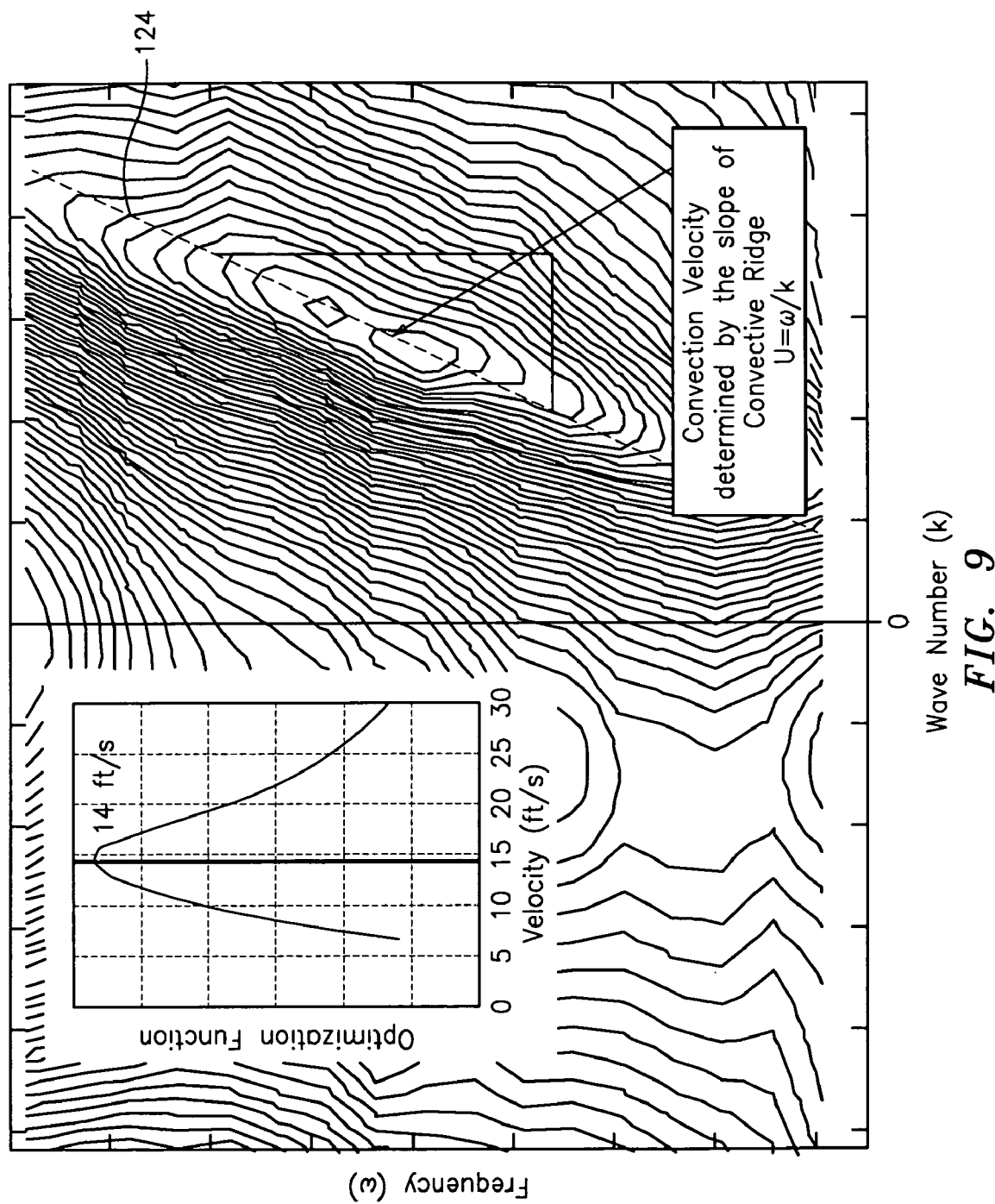
FIG. 9 a $k\omega$ plot of data processed from an apparatus embodying the present invention that illustrates slope of the convective ridge, and a plot of the optimization function of the convective ridge.

In the case of suitable turbulent eddies 120 (see FIG. 8) being present, the power in the k-$\omega$ plane shown in a k-$\omega$ plot of FIG. 9 shows a convective ridge 124. The convective ridge represents the concentration of a stochastic parameter that convects with the flow and is a mathematical manifestation of the relationship between the spatial variations and temporal variations described above. Such a plot will indicate a tendency for k-$\omega$ pairs to appear more or less along a line 124 with some slope, the slope indicating the flow velocity.

Once the power in the k-$\omega$ plane is determined, a convective ridge identifier 134 uses one or another feature extraction method to determine the location and orientation (slope) of any convective ridge 124 present in the k-$\omega$ plane. In one embodiment, a so-called slant stacking method is used, a method in which the accumulated frequency of k-$\omega$ pairs in the k-$\omega$ plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by $k=\omega/u$, the analyzer 136 determines the flow velocity, Mach number and/or volumetric flow, which are output as parameters 21. The volumetric flow is determined by multiplying the cross-sectional area of the inside of the pipe with the velocity of the process flow.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 10:
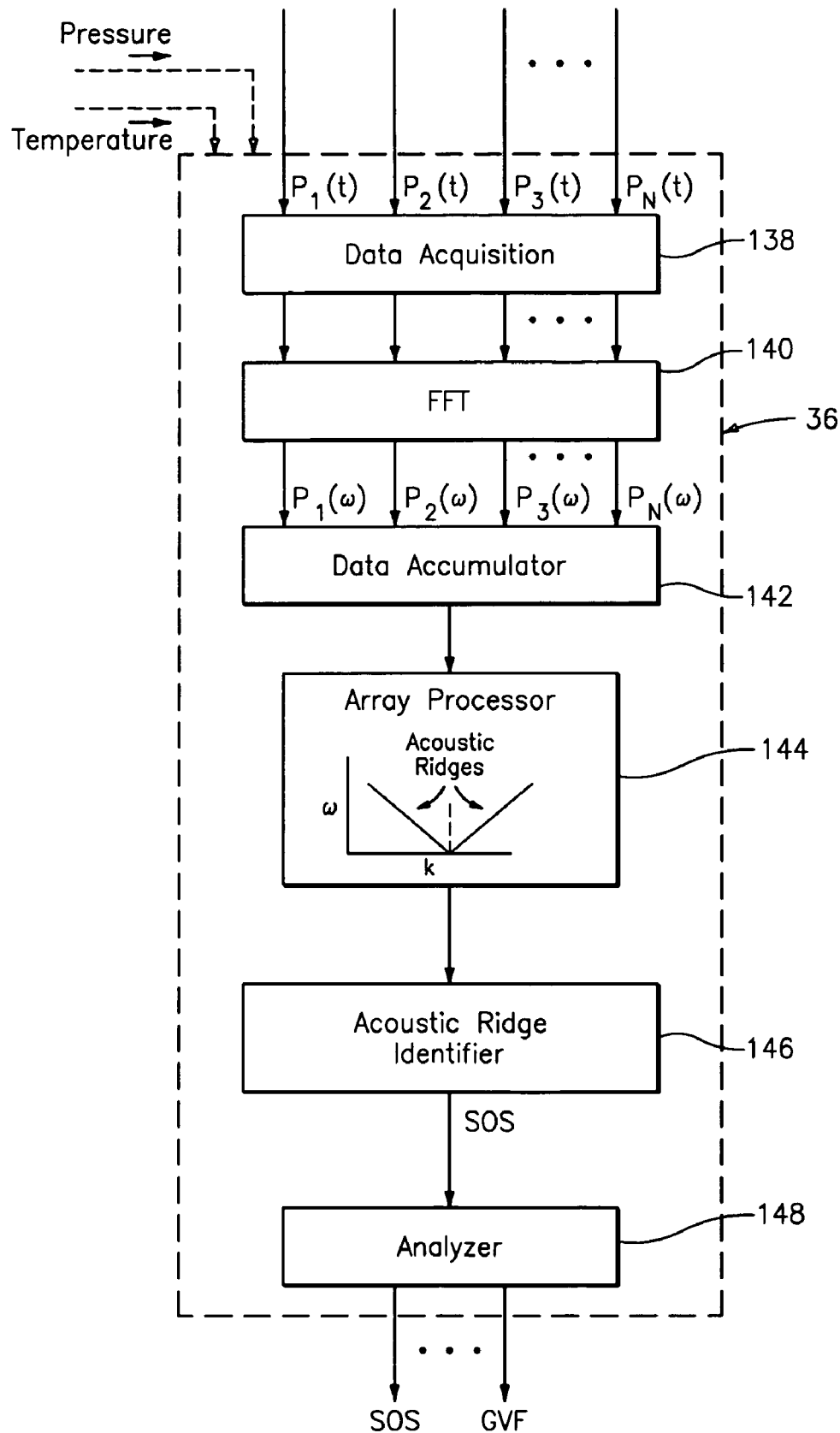
FIG. 10 is a block diagram of a second embodiment of a flow logic used in the apparatus of the present invention.

Referring to FIG. 10, another example of flow logic 36 is shown. While the examples of FIG. 7 and FIG. 10 are shown separately, it is contemplated that the flow logic 36 may perform all of the functions described with reference to FIG. 7 and FIG. 10. As previously described, the array 11 of at least two sensors 15 located at two at least two locations x1,x2 axially along the pipe 14 sense respective stochastic signals propagating between the sensors within the pipe at their respective locations. Each sensor 15 provides a signal indicating an unsteady pressure at the location of each sensor 15, at each instant in a series of sampling instants. One will appreciate that the sensor array 11 may include more than two pressure sensors 15 distributed at locations $x_1 \ldots x_N$. The pressure generated by the acoustic pressure disturbances (e.g., acoustic waves 122, see FIG. 8) may be measured through strained-based sensors and/or pressure sensors. The sensors 15 provide analog pressure time-varying signals $P_1(t), P_2(t), P_3(t), \ldots P_N(t)$ to the flow logic 36. The flow logic 36 processes the signals $P_1(t), P_2(t), P_3(t), \ldots P_N(t)$ from the sensors 15 to first provide output signals indicative of the speed of sound propagating through the fluid (process flow) 13, and subsequently, provide output signals in response to pressure disturbances generated by acoustic waves propagating through the process flow 13, such as velocity, Mach number and volumetric flow rate of the process flow 13.

The signal processor 19 receives the pressure signals from the array 11 of sensors 15. A data acquisition unit 138 digitizes selected ones of the pressure signals $P_1(t) \ldots P_N(t)$ associated with the acoustic waves 122 propagating through the pipe 14. Similarly to the FFT logic 128 of FIG. 7, an FFT logic 140 calculates the Fourier transform of the selected digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals.

A data accumulator 142 accumulates the frequency signals $P_1(\omega) \ldots P_N(\omega)$ over a sampling interval, and provides the data to an array processor 144, which performs a spatial-temporal (two-dimensional) transform of the sensor data, from the xt domain to the k-$\omega$ domain, and then calculates the power in the k-$\omega$ plane, as represented by a k-$\omega$ plot.

To calculate the power in the k-ω plane, as represented by a k-ω plot (see FIG. 11) of either the signals or the differenced signals, the array processor 144 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15.

Figure 11:
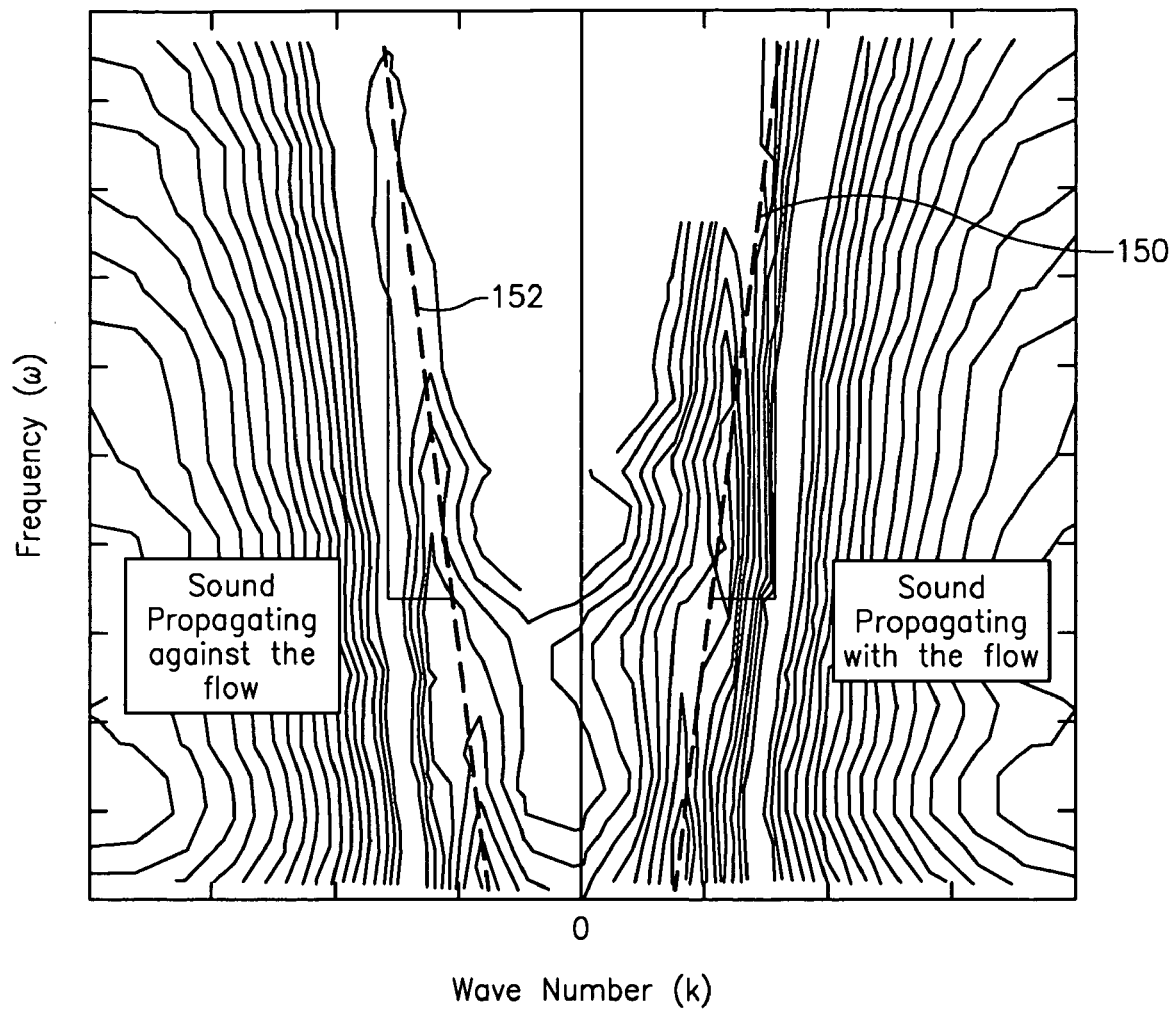
FIG. 11 a $k\omega$ plot of data processed from an apparatus embodying the present invention that illustrates slope of the acoustic ridges.

In the case of suitable acoustic waves 122 being present in both axial directions, the power in the k-ω plane shown in a k-ω plot of FIG. 11 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-ω pairs to appear more or less along a line 150, 152 with some slope, the slope indicating the speed of sound.

The power in the k-ω plane so determined is then provided to an acoustic ridge identifier 146, which uses one or another feature extraction method to determine the location and orientation (slope) of any acoustic ridge present in the left and right k-ω plane. The velocity may be determined by using the slope of one of the two acoustic ridges 150, 152 or averaging the slopes of the acoustic ridges 150, 152.

Finally, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 7, the array processor 144 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the process flow 13 is using array processing techniques to define an acoustic ridge in the k-ω plane as shown in FIG. 11. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

While the sonar-based flow meter using an array of sensors 15-18 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2+Bx+C=0$$

wherein x is the speed of sound, $A=1+rg/rl*(K_{eff}/P-1)-K_{eff}/P$, $B=K_{eff}/P-2+rg/rl$; $C=1-K_{eff}/rl*a_{meas}{}^2)$; Rg=gas density, rl=liquid density, $K_{eff}$=effective K (modulus of the liquid and pipewall), P=pressure, and $a_{meas}$=measured speed of sound.

Effectively, $$\text{Gas Volume Fraction (GVF)}=(-B+\text{sqrt}(B^2-4*A*C))/(2*A)$$

Alternatively, the sound speed of a mixture can be related to volumetric phase fraction ($\phi_i$) of the components and the sound speed (a) and densities (ρ) of the component through the Wood equation.

$$\frac{1}{\rho_{mix} a_{mix\infty}^2} = \sum_{i=1}^{N} \frac{\phi_i}{\rho_i a_i^2} \text{ where } \rho_{mix} = \sum_{i=1}^{N} \rho_i \phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity (aeff) for one dimensional compression is given by the following expression:

$$a_{\mathit{eff}} = \cfrac{1}{\sqrt{\cfrac{1}{a_{mix_\infty}^2} + \rho_{mix}\cfrac{2R}{Et}}} \qquad (\text{eq 1})$$

Figure 12:
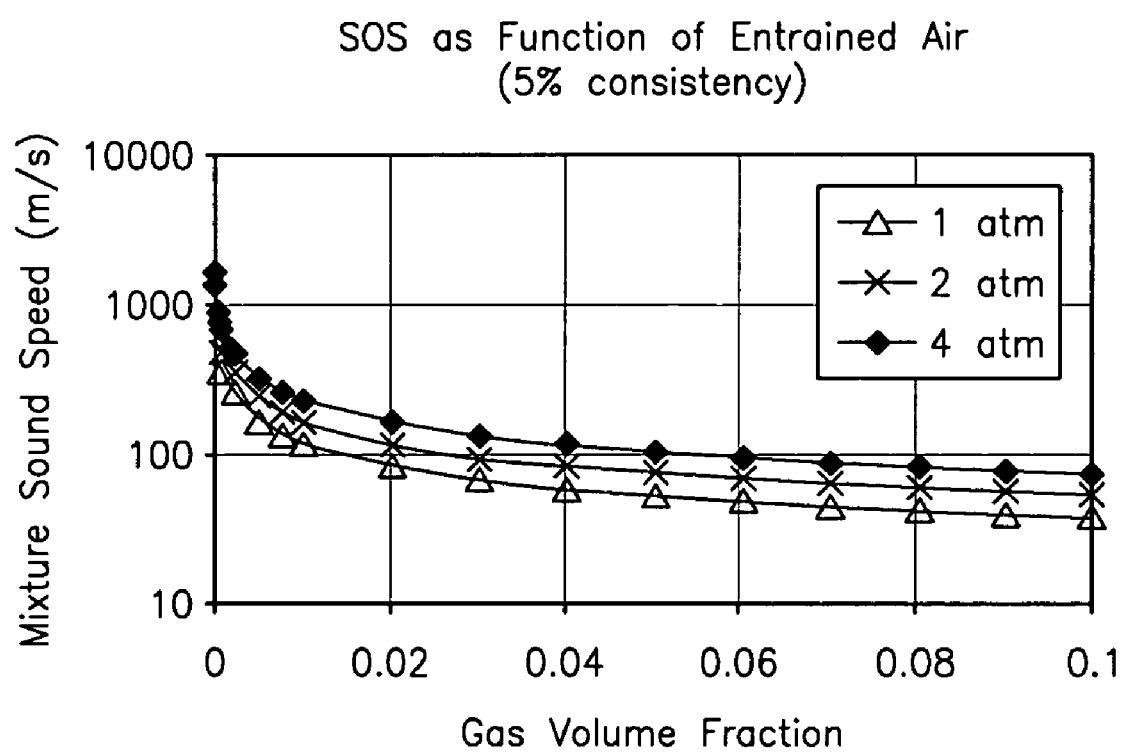
FIG. 12 is a plot of mixture sound speed as a function of gas volume fraction for a 5% consistency slurry over a range of process pressures.

The mixing rule essentially states that the compressibility of a process flow ($1/(\rho a^2)$) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 12.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\cfrac{1}{1 + \cfrac{\varphi_p \rho_p}{\rho_f\left(1 + \omega^2 \cfrac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\rho_p$ is the volumetric phase fraction of the particles in the mixture.

Figure 13:
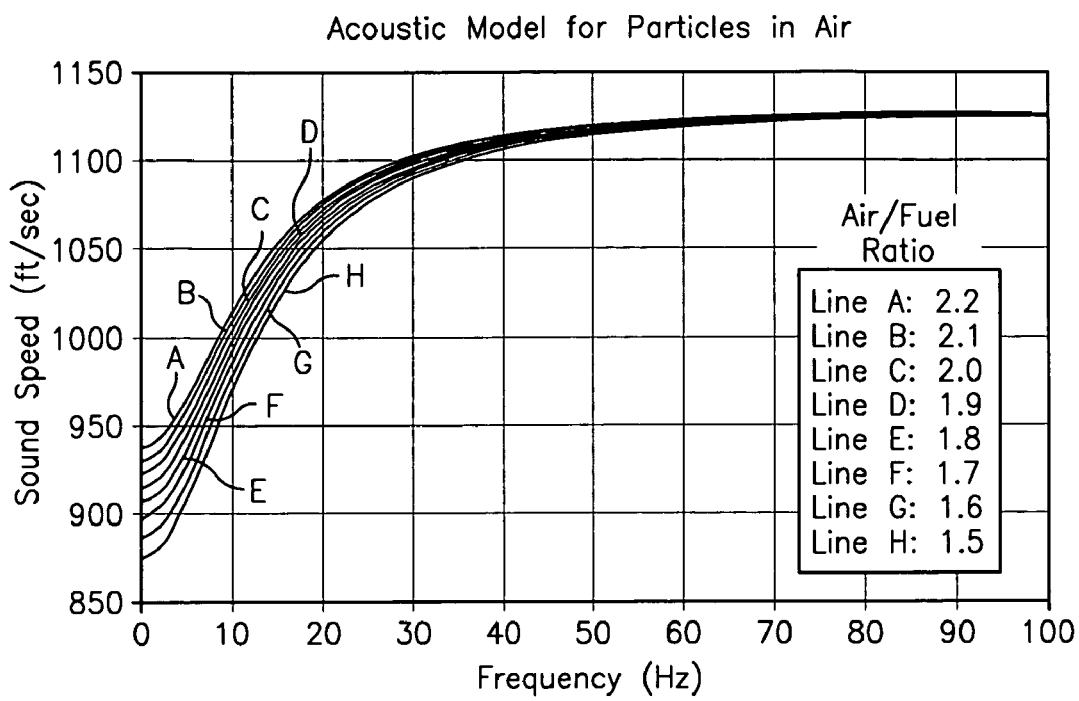
FIG. 13 is a plot of sound speed as a function of frequency for air/particle mixtures with fixed particle size and varying air-to-particle mass ratio.
Figure 14:
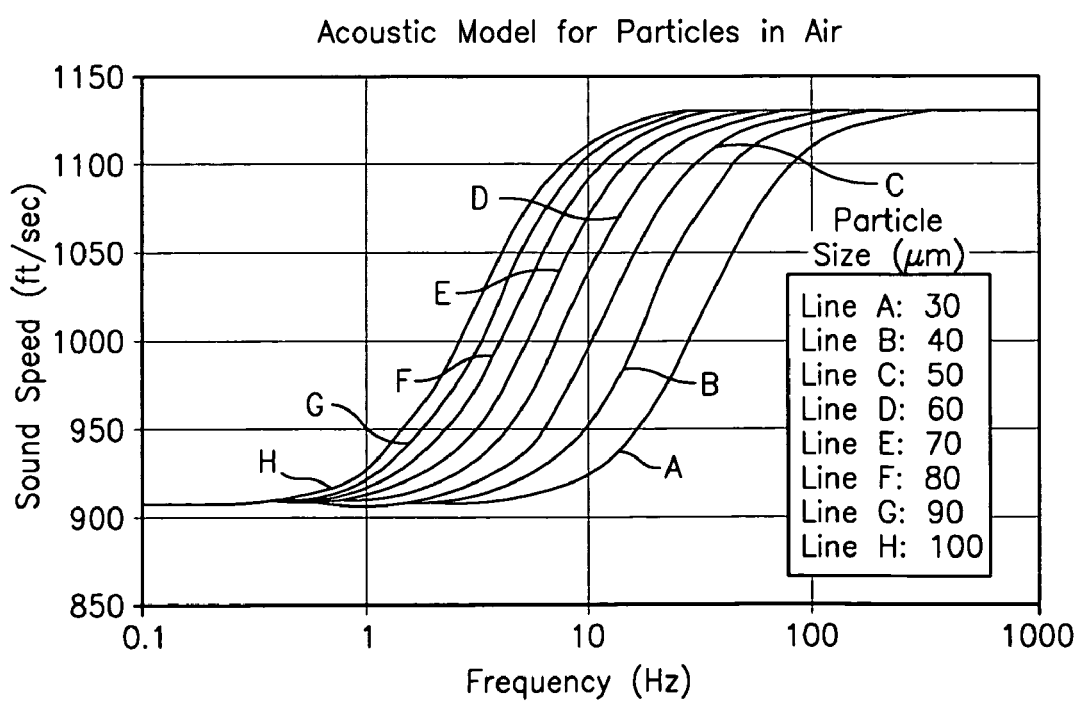
FIG. 14 is a plot of sound speed as a function of frequency for air/particle mixtures with varying particle size where the air-to-particle mass ratio is fixed.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 13 and FIG. 14 show the dispersive behavior in relations to the speed of sound for coal/air mixtures with parameters typical of those used in pulverized coal deliver systems.

In particular FIG. 13 shows the predicted behavior for nominally 50 micrometer size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 14 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 13 and FIG. 14 illustrate an important aspect of the present invention. Namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 micrometer size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIG. 7 and FIG. 10 depict two different embodiments of the flow logic 36 to measure various parameters of the flow process, the present invention contemplates that the functions of these two embodiments may be performed by a single flow logic 36.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring a parameter of a fluid passing through a pipe, the pipe having a sleeve disposed therein through which the fluid passes, the apparatus comprising:
   a spatial array of pressure sensors disposed between the sleeve and an inside surface of the pipe at different axial locations along the pipe, each of the pressure sensors providing a pressure signal indicative of unsteady pressure within the pipe at a corresponding axial location of the pipe; and
   a signal processor configured to:
      receive the pressure signals from each of the pressure sensors, and
      determine the parameter of the fluid using the pressure signals from the pressure sensors.

2. The apparatus of claim 1, wherein the sleeve and the sensors are disposed within a pipe spool piece having flanges disposed on opposing ends.

3. The apparatus of claim 2, wherein end portions of the sleeve conform to at least a portion of the flanges.

4. The apparatus of claim 2, wherein the pipe spool piece is formed from cylindrical sections.

5. The apparatus of claim 2, wherein the pipe spool piece includes a housing attached thereto for containing electrical components associated with the pressure sensors.

6. The apparatus of claim 1, wherein the sleeve is formed from a polymer.

7. The apparatus of claim 6, wherein the sleeve is formed from Teflon.

8. The apparatus of claim 1, wherein the sleeve has grooves formed therein for receiving the sensors.

9. The apparatus of claim 1, wherein the pipe is formed from a material relatively more rigid than the sleeve, and the sensors are compressed between the pipe and the sleeve.

10. The apparatus of claim 1, wherein the parameter of the fluid includes at least one of: density of the fluid, volumetric flow rate of the fluid, mass flow rate of the fluid, composition of the fluid, entrained air in the fluid, consistency of the fluid, size of particles in the fluid, and health of a device causing the unsteady pressures to be generated in the pipe.

11. The apparatus of claim 1, wherein the number of pressure sensors in the pressure sensors is equal to one of:
   2, 3, 4, 5, 6, 7, 8, 9, 10, 11, 12, 13, 14, 15, 16, 17, 18, 19, 20, 21, 22, 23, and 24.

12. The apparatus of claim 1, wherein in the pressure sensors are selected from one or more of: piezoelectric, piezoresistive, strain gauge, PVDF, optical sensors, ported ac pressure sensors, accelerometers, velocity sensors, and displacement sensors.

13. The apparatus of claim 1, wherein each of the pressure sensors is formed from a cable wrapped around the sleeve, the cable including:
   a first electrical conductor,
   a piezoelectric material disposed around the first electrical conductor,
   a second electrical conductor disposed around the piezoelectric material, and
   a dielectric jacket disposed around the piezoelectric material, the first electrical conductor, and the second electrical conductor.

14. The apparatus of claim 13, wherein the cable is wrapped around the sleeve at least two times.

15. The apparatus of claim 13, wherein the cable has one of: a circular cross section and a quadrilateral cross section.

16. The apparatus of claim 13, wherein the piezoelectric material includes PVDF.

* * * * *